UNITED STATES PATENT OFFICE.

ARON FERDINAND WESTERLUND, OF STOCKHOLM, SWEDEN.

CARBONACEOUS ANTISEPTIC DRESSING.

SPECIFICATION forming part of Letters Patent No. 322,664, dated July 21, 1885.

Application filed June 6, 1884. (Specimens.) Patented in Sweden April 21, 1880, No. 106; in Denmark August 30, 1880; in England May 21, 1884, No. 8,020 and No. 11,322; in France May 21, 1884, No. 162,282; in Belgium May 23, 1884, No. 65,237, and in Germany May 30, 1884, No. 31,146.

*To all whom it may concern:*

Be it known that I, ARON FERDINAND WESTERLUND, of Stockholm, Sweden, have invented a new and improved method of producing carbon wool for hygienic and technical purposes from vegetable material, of which the following is a specification.

The object of my invention is to provide a new and improved carbon wool from vegetable matter, which can be used in electric lamps for insulating purposes, for the conservation of various perishable substances, disinfection, and keeping wounds clean.

The invention consists in a carbon wool obtained by soaking vegetable matter in mixtures of water and phosphoric acid or boracic acid, or phosphates or borates, then drying the material and then carbonizing it.

The carbon-wool is made from straw, hay, paper, cork waste, cotton, bog, and other vegetable matter. The above-mentioned materials are soaked in one or more of the following mixtures, either separately or mixed in any manner. The mixtures are as follows: Phosphoric acid, from one to seven parts; water, from seventy to one hundred parts. Or, boracic acid, from one to five parts; water, from forty to sixty parts. Or, phosphate or borate, from one to five parts; water, from twenty to forty parts. After being soaked the materials are dried more or less, and are then carbonized, either by the usual combustion, or, if the wool is to have any special shape, it is carbonized between wire grates.

Owing to the peculiar treatment of the material before carbonizing it, the carbonization may take place with the access of air, and yet nearly as great a quantity is obtained as by the combustion without the access of air.

Having thus fully described my invention, I claim as new, and desire to secure by Letters Patent—

The herein-described method of producing carbonaceous antiseptic dressing, consisting in soaking vegetable matter in a mixture of water and phosphoric acid, then drying it, and finally partially carbonizing it, substantially as set forth.

Signed by me this 25th day of April, 1884.

ARON FERDINAND WESTERLUND.

Witnesses:
   E. H. BRUHN,
   H. ANDERSSON.